United States Patent
Baer et al.

[15] 3,680,706
[45] Aug. 1, 1972

[54] SCREEN FILTER UNIT

[72] Inventors: Herbert J. Baer, Ludwigsburg; Kurt R. Hense, Speyer-Nord; Richard Hoferer, Bissingen/Enz, all of Germany

[73] Assignee: Filterwerk Mann & Hummel GmbH

[22] Filed: Jan. 19, 1970

[21] Appl. No.: 4,009

[30] Foreign Application Priority Data

Feb. 6, 1969 Germany.............P 19 05 844.7

[52] U.S. Cl................................210/238, 210/345
[51] Int. Cl. .................................B01d 25/22
[58] Field of Search......210/238, 314, 341, 452, 479, 210/232, 323, 345

[56] References Cited

UNITED STATES PATENTS

| | | | |
|---|---|---|---|
| 3,438,502 | 4/1969 | Schmidt, Jr. et al. | 210/232 |
| 2,221,210 | 11/1940 | Soderquist | 210/341 X |
| 3,189,179 | 6/1965 | McMichael | 210/238 |
| 3,037,634 | 6/1962 | Mills | 210/232 X |

FOREIGN PATENTS OR APPLICATIONS 29,132  7/1907  Austria..........................210/345
818,227  9/1937  France..........................210/345

Primary Examiner—Reuben Friedman
Assistant Examiner—Frederick F. Calvetti
Attorney—Otto John Munz

[57] ABSTRACT

A screen filter unit with a plurality of interchangeable tubular screen elements clustered around a center, the liquid flowing inwardly and upwardly through the screen, the filtrate discharging axially from the elements through a single manifold flange. The screen elements have a segment-shaped form obtained by bending flat screen mesh so as to form a peripheral longitudinal flange but, the filter screen being supported on the inside by a support screen. Each element has a closed bottom end with a guide pin attached, and an open top end adapter with another guide pin parallel and offset to each other. When mounted, the elements are held under a controlled clamping pressure between the bottom flange of the unit and the manifold flange the flanges being held together by a central rod nut and handle attached thereto. The clamping pressure is determined by springs arranged between the screen elements and the bottom flange.

9 Claims, 3 Drawing Figures

PATENTED AUG 1 1972

INVENTORS
HERBERT J. BAER,
KURT R. HENSE,
RICHARD HOFERER

ATTORNEY

SCREEN FILTER UNIT

BACKGROUND OF THE INVENTION

FIELD OF THE INVENTION

The invention relates to screen filters and in particular to screen filter units comprising a plurality of tubular screen elements removably mounted in the filter unit.

DESCRIPTION OF THE PRIOR ART

Screen filters of this kind are primarily used for the filtration of liquids. Compared to fiber-type filters, they have the advantage that they can be readily cleaned and no problems such as providing spare parts in remote areas arise. Compared to plate-type filters, they are generally of a simpler design and also provide a larger effective filtering area.

In the absence of a complicated back-flushing device which latter, even if available, is not always satisfactory, the screen surface must be easily accessible for cleaning purposes. For this reason, the screen filter units are normally so designed that they can be dismantled for cleaning.

In the German utility model Pat. No. 1,753,651 is disclosed a screen filter unit having several hollow cylindrical screen elements in a concentric arrangement. The liquid flows through adjacent screen elements radially from the inside out through the one, and in opposite direction through the other. Between the screen elements is a common outlet chamber for the filtrate or a common inlet chamber for the medium which is to be filtered.

This design, especially when being of large dimensions, has the disadvantage that the fine mesh of the screen is easily damaged during the removal of the filter unit for cleaning purposes. It is known to protect the screen against such damage by adding a protective screen of coarse mesh, or a perforated sheet casing or the like, but these parts not only cover up a substantial part of the screen surface, they also complicate the cleaning operation and increase the cost of manufacture. In the case of filter units where the liquid flows radially from the inside out and where the filtration pressure is opposed by an exterior sleeve of coarse mesh, there still exists the danger that the screen mesh may collapse toward the inside when it is subjected to a reverse flow. Furthermore, it is difficult to manufacture screen sleeves of this kind. The provision of a further supporting screen on the inside would further increase the cost and also complicate the cleaning of the filter unit.

In the earlier-mentioned publication is also mentioned the possibility of providing concentrically arranged tubular screen elements where the liquid flows through all the elements from the outside to the inside due to the provision of separating sleeves between two adjacent screens, each separating sleeve being sealed on one of its ends to one of the screens, and on its opposing end to the other screen. The separating sleeves required for this purpose are costly, however. In general, this type of cylindrical screen filter unit is also characterized by the requirement of a large cleaning container with a high level of cleaning fluid to allow complete dipping of the screen sleeves. Special care must also be taken with filters where the flow is radially inward, to prevent any mud from getting into the filter cavity as the latter would be on the side of the filtrate after re-installation of the filter unit. This makes it necessary to cover up the filtrate outlet side before dipping it into the cleaning liquid, meaning that the large filter units require relatively costly cover plates.

SUMMARY OF THE INVENTION

It is an object of the invention to provide a screen filter unit which facilitates the cleaning operation by eliminating the above-mentioned shortcomings, while being efficient in operation and economical in manufacture.

This object is attained by providing a screen filter unit comprising a cluster of interchangeable tubular screen elements whose cross-section resembles a circular segment with its inner and outer ends rounded off and its lateral flanks slightly bulging, outward to counteract the fluid pressure, the screen elements each having a closed bottom end and an open upper end for the discharge of the filtrate, a longitudinal flange butt at the filter unit periphery, and positioning means at both of their ends to form a single unit when assembled.

This screen filter unit can be serviced very easily. The cleaning operation is greatly facilitated by the fact that the unit is subdivided into many separate lightweight filter elements. The danger of damage to the screen mesh during removal and re-installation of the complete screen filter unit is eliminated, the flange butts of the screen elements preventing any contact between the screen mesh itself and the filter housing. The individual filter elements can be washed in a small cleaning container with a relatively low level of cleaning liquid. As one end of the screen element is already closed, only the opening at the other end needs to be sealed off during the cleaning operation. Dismantling and assembly of the filter unit is very simple because the screen elements are independently positioned against the center rod and the bottom flange of the unit, even after the manifold flange which clamps the elements between it and the bottom flange, is removed. This permits quick and easy Re-attachment of the manifold flange after cleaning. The particular shape of the screen elements provides for an optimum utilization of the space available for the filter unit.

A preferred embodiment of the invention includes a shoulder on the upper end portion of the center rod to determine a fixed distance between the bottom flange and the removable manifold flange and further includes compression springs between each of the screen elements and the bottom flange to provide a predetermined, limited axial pressure between the screen elements and the manifold flange, so as to eliminate the possibility of excessive axial clamping pressures and to compensate for length differences between different elements.

The above-described features can be provided in a particularly simple design by providing for each screen element a guide pin extending vertically downward from the bottom of the element and into a guide bore arranged in the bottom flange, the aforementioned compression spring being of the helical type and retained on its upper end in a groove provided in the guide pin.

The invention further proposes to provide on the bottom flange a peripheral downwardly extending skirt to allow the assembled unit to be set down on an even surface, such as a work bench while protecting the guide pins protruding through the flange wall against accidental impacting.

AS a further feature the invention proposes to manufacture the individual screen elements by forming the tubular elements from a web of screen mesh so as to include a longitudinal butt being a U-channel, at the outermost point of the profile, the butt being thus positioned at the periphery of the filter unit. This peripheral butt is preferably in the form of upended edges covered by a U-shaped strip of sheet metal. The strip may be fastened to the butt by simple clamping, by bonding, or by soldering.

The invention also provides a clamping nut to retain the manifold flange, the nut being preferably of the handle-type and the handle itself serves as a locking device, when it is folded away.

BRIEF DESCRIPTION OF THE DRAWINGS

In the following the invention is disclosed in more detail, using a particular embodiment shown by way of an example in the drawings where.

DESCRIPTION OF THE PREFERRED EMBODIMENT

Figure 1:
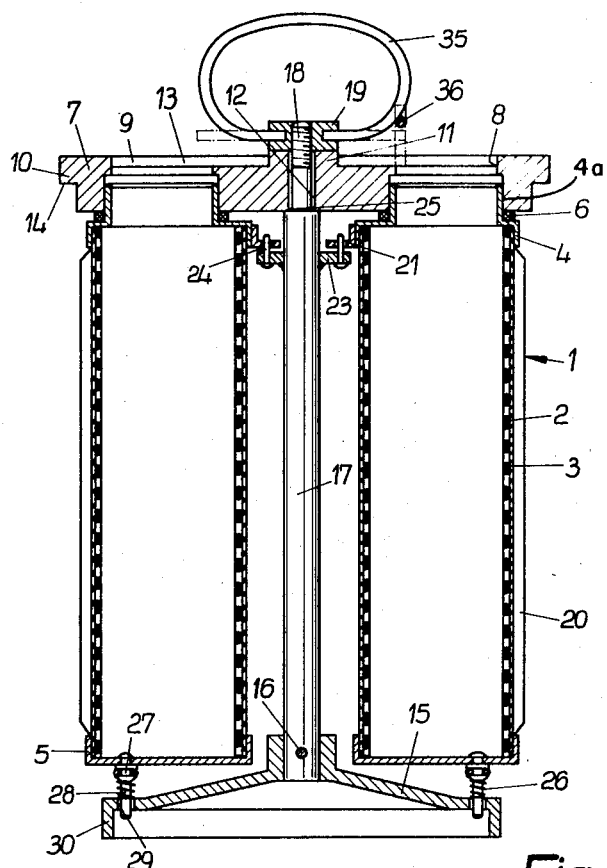
FIG. 1 shows, in a longitudinal cross-section, an assembled screen filter unit embodying the invention.
Figure 2:
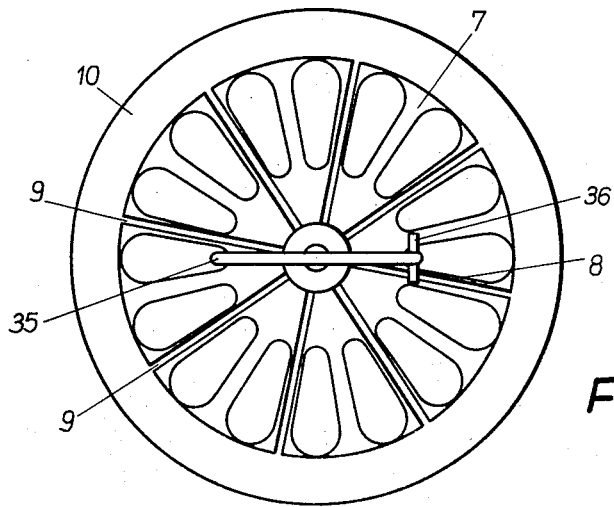
FIG. 2 shows the filter unit of FIG. 1 in a top plan view.

As shown in the drawings, the screen filter unit comprises a plurality of tubular screen elements 1 in a cluster arrangement. Each of the screen elements consists essentially of a coarse supporting screen 2 which is surrounded by a fine-mesh filter screen 3, an adapter piece 4 at the top, and a closed bottom 5. The screen elements 1 are arranged in parallel alignment, the adapters 4 with the gaskets 6 engaging a manifold flange 7, with a necked opening 4a wherein they are also positioned laterally, so as to provide a separate filtrate discharge opening 8 for each screen element. The manifold flange 7 has a rim 10 and a hub portion 11 with a central bore 12; between the rim 10 and the hub portion 11 extend radial ribs 9 enclosing between them depressions 13. The rim 10 is further provided with a peripheral shoulder 14 on which the screen filter unit rests against a corresponding interior shoulder of the filter screen housing (not shown in the drawing), thereby separating the space containing filtrate from the space containing unfiltered liquid.

The screen elements are supported by, and positioned against, a bottom flange 15 in a manner described further below. To the bottom flange 15 is permanently attached, by means of a pin 16, a center rod 17, the upper end portion of which fits into the bore 12 of the manifold flange 7 and carries a threaded end 18. A handle and nut 19, when tightened against the hub portion 11, pulls together the bottom flange 15 and the manifold flange 7 so as to axially clamp the screen elements 1 between them.

Figure 3:
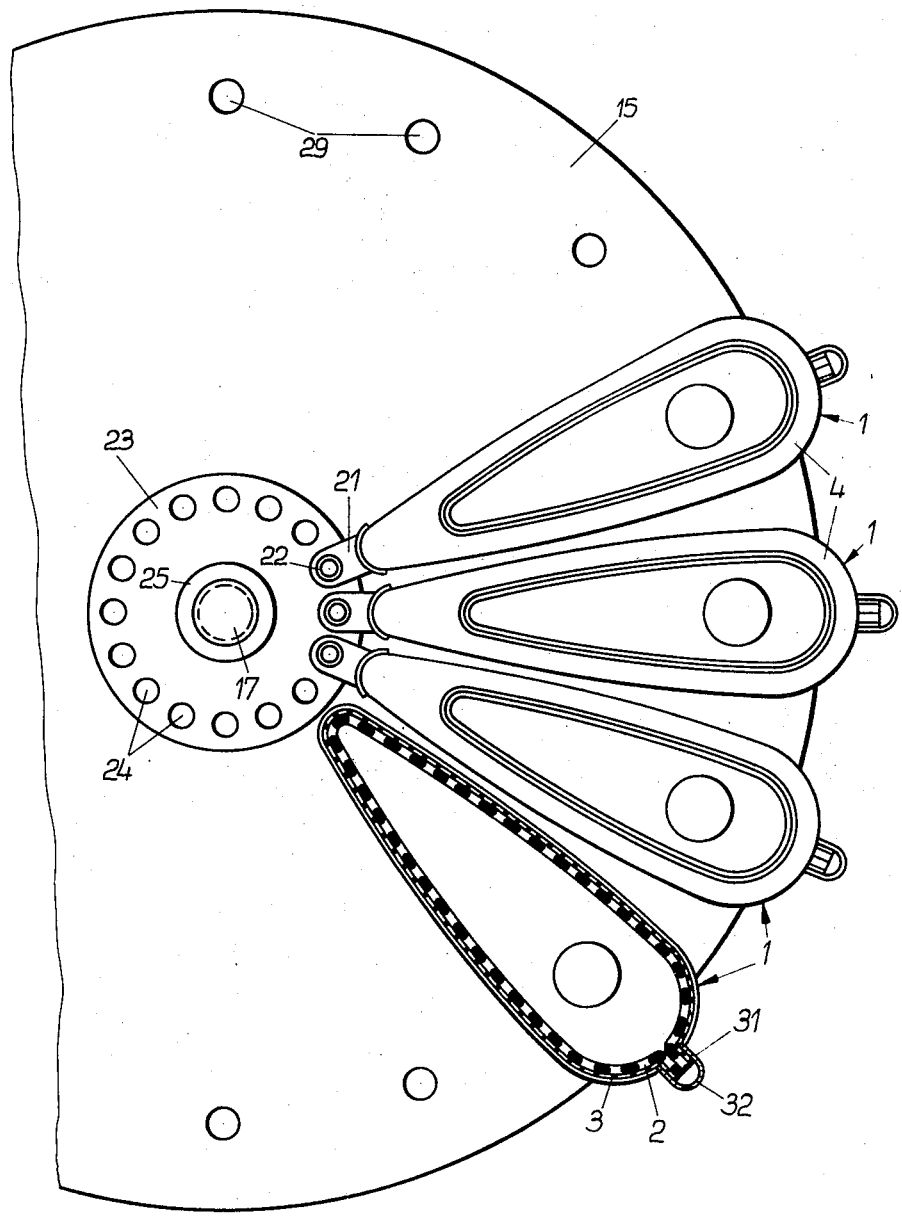
FIG. 3 shows, in an enlarged plan view, several parts of the filter unit of FIG. 1 some as seen from the top, and others in cross-section.

The screen elements 1 are of identical dimensions and are therefore interchangeable. Each element is sealed off at its lower end by the bottom 5. The cross-sectional outline of the screen elements 1 resembles the shape of a circular segment (as can be seen in FIG. 3), the ends of the segments being rounded off and their lateral flanks slightly bulging. At the inside of the screen elements may be arranged conventional reinforcing elements, in case the filter unit is subjected to high differential pressures under which the filter screen 3 and the supporting screen 2 alone might not stand up.

The screen elements 1 are arranged in close proximity to one another in a circular cluster, and each element has a longitudinal flange butt 20 forming the periphery of the filter unit. Each screen element includes on its inner upper end, attached to the adapter 4 a positioning tag 21 with a vertical bore 22. To the center rod 17 is welded, below the level of the positioning tabs 21 a positioning ring 23 which carries a number of vertical guide pins 24, one for each screen element. When the filter unit is assembled, these guide pins 24 engage the corresponding bores 22 of the positioning tabs 21 of the screen elements.

The center rod 17 includes in its upper portion a shoulder 25 which determines the assembled position of the manifold flange 7 relative to the bottom flange 15. Each screen element further includes a compression spring 26 arranged between its bottom 5 and the bottom flange 15 so as to produce a limited axial clamping pressure between the screen elements 1 and the manifold flange 7, at the same time compensating for possible length differences between different screen elements.

In the preferred embodiment the compression springs 26 are helical springs, and the bottoms 5 of the screen elements have positioning pins 28 extending downward therefrom through the springs 26. To retain the springs with the screen elements during dismantling, the former have a restricted upper end engaging corresponding grooves 27 of the positioning pins 28. The bottom positioning pins 28 of the screen elements engage spaced bores 29 in the bottom flange 15, thereby maintaining the lower ends of the screen elements in regularly spaced positions.

The bottom flange 15 also carries at its periphery a downward-extending skirt 30 to support the filter unit after removal on an even surface and to protect the bottom positioning pins 28 against accidental impacting.

The tubular screen elements 1 are formed by bending flat webs of filtering screen and support screen into segment-shaped tubular sections with a longitudinal seam 31. As can be seen from FIG. 3, these longitudinal seams 31 are arranged at the periphery of the screen filter unit in the form of a flange butt 20, covered by a U-shaped sheet metal strip 32. In the embodiment described soft solder is used to close the longitudinal seam 31 and to attach the strip 32.

The handle and nut 19 includes a pivotable handle 35 which includes a transversely arranged safety pin 36 attached to one side of the handle. When the handle 35 is folded down from the operative position, the safety pin 36 reaches into one of the depressions 13 of the manifold flange, so as to be secured against rotation by the adjacent radial rib 9. The folded-down position of the handle 35 and safety pin 36 are indicated by a dotted line in FIG. 1.

In operative use the liquid flows through the screen filter elements 1 radially from the outside in. The particular shape of the screen elements is maintained, even when the flow is reversed either intentionally or accidentally. For servicing, the screen filter unit can be pulled out of the filter housing by means of its pivotable handle 35. If during removal or replacement the filter unit touches any part of the filter housing, the screen elements are effectively protected against denting by their flange butt 20. Once removed from the housing the screen filter unit can be set down on the skirt 30 of its bottom flange, and the unit can be dismantled for cleaning of the elements. After the handle nut 19 has been unscrewed from the center rod 17, the manifold flange 7 can be lifted from the unit. The screen elements remain in place on the unit, their upper ends being positioned on the positioning tabs 21 engaged by the positioning pins 24 of the center rod 17, and their lower ends, being positioned by the positioning pins 28 engaging the bores 29 in the bottom flange 15. The screen elements can now be freely removed one by one, and, after their open end is sealed off, they can be cleaned in a container holding cleaning liquid by using a brush, for example. The screen filter unit is re-assembled by reversing the steps of the dismantling procedure. After all the screen elements are positioned in the cluster, the manifold 7 can be put in place without difficulty and clamped tight.

It is of course obvious that the various constructive details can be replaced by equivalent elements without departing from the scope of the invention. For example, it is possible to provide the adapters 4 with downward-oriented hooks engaging corresponding bores in the positioning ring 23.

We claim:

1. A multiple-element screen filter unit which is constructed to be conveniently insertable and removable from a filter housing as a cluster assembly of filter elements, comprising in combination:
   a support structure including a bottom flange and a center rod rigidly connected thereto;
   a plurality of interchangeable tubular screen elements, each independently and removably arranged in a circular cluster around the center rod, the screen elements having a closed bottom end and an open upper end for radially inwardly and upwardly directed liquid flow and top discharge;
   a disc-shaped manifold flange forming the upper support for the screen elements, thereby angularly spacing and orienting the screen elements, the latter being clamped longitudinally between the bottom flange and the manifold flange and discharging the filtrate through openings in the manifold flange; and
   positioning means excluding the manifold flange for maintaining the individual screen elements in an angularly spaced and oriented cluster assembly and thereby constructed before the manifold flange is mounted onto the cluster and after it is removed therefrom to permit easy attachment and removal of each screen element from the cluster.

2. A screen filter unit as defined in claim 1, wherein the individual screen elements include an inner coarse support screen and an outer fine-mesh filtering screen, the cross-sectional shape of the screen elements resembling a truncated circular segment with the inner and outer segmental arc portions replaced by approximate semi-circles and the lateral flanks bulging outwardly in order to prevent collapse of the elements under increasing flow resistance across the screen.

3. A screen filter unit as defined in claim 2, wherein the individual screen elements further include each a reinforced longitudinal flange butt at the radial crest of the segmental profile, the inner support screen being formed of one piece and its ends being held together at the flange butt by means of a reinforcing U-channel, the periphery of the assembled screen filter unit thus having a series of longitudinal ribs protecting the exposed screen elements against accidental denting.

4. A screen filter unit as defined in claim 1, wherein the clamping means include a shoulder on the upper portion of the center rod so as to position the assembled manifold flange relative to the bottom flange, a threaded upper end on the center rod, and a handle nut to clamp the manifold flange against this shoulder; and wherein
   each of the screen elements includes a compression spring located between the bottom flange and the bottom end of the screen element so as to urge the screen elements into sealing contact with the manifold flange.

5. A screen filter unit as defined in claim 1, wherein the positioning means include upper positioning means linking the screen elements individually to the center rod in the vicinity of the manifold flange, and lower positioning means linking the screen elements individually to the bottom flange in the vicinity of the outer periphery of the screen elements.

6. A screen filter unit as defined in claim 5, wherein the upper positioning means include a positioning shoulder on the upper portion of the center rod with a plurality of spaced upwardly oriented positioning pins;
   each screen element includes near its upper end a radially inwardly extending positioning tab with a bore which slidably engages one of the positioning pins on the positioning shoulder; and
   the lower positioning means include on each screen element near its outer periphery a downwardly-oriented positioning pin extending from the closed bottom end of the screen element, the bottom flange including a plurality of angularly spaced vertical bores for the positioning pins of the screen elements, whereby the screen elements are maintained in an angularly spaced and oriented cluster assembly, when the manifold is not mounted on the assembly.

7. A screen filter unit as defined in claim 4, wherein the positioning means include upper positioning means linking the screen elements individually to the center rod in the vicinity of the manifold flange, and lower positioning means linking the screen elements individually to the bottom flange;

the lower positioning means including on each screen element near its outer periphery a downwardly oriented positioning pin extending from the closed bottom end of the screen element, the bottom flange including a plurality of angularly spaced vertical bores for the positioning pins of the screen elements; and the compression springs which are a part of the clamping means are helical springs arranged around the lower positioning pins, the upper ends of the helical springs being captured on their respective pins.

8. A screen filter unit as defined in claim 4, wherein the clamping means further include, as part of the handle nut, a closed handle which can be pivoted downward when not in use, the handle including a retaining pin which, when the handle is folded down, engages a part of the manifold flange to prevent rotation of the handle nut.

9. A screen filter unit comprising in combination;

a support structure including a bottom flange having locating holes near its periphery, and a center rod, rigidly connected thereto, having upper locating pins near its upper end;

a plurality of interchangeable elongated segmental tubular outwardly deformed filter elements removably arranged, with their longitudinal axis in parallel, in a circular cluster around said center rod, said elements having longitudinal reinforcements and closed bottoms, with lower locating pins mounted thereon, engaging said locating holes in said bottom flange;

clamping springs mounted on said lower locating pins;

said elements having an open upper end for radially inward and upward directed liquid flow and upper discharge;

said open upper end comprising an opening of oblong form having an adaptor collar with a gasket flange around its periphery;

a manifold flange forming the upper support for said screen elements, having oblong openings said elements being clamped longitudinally between said bottom flange and said manifold flange, said adaptor collars of said elements engaging in said oblong openings of said manifold flange;

locating brackets, having upper locating holes, being attached to the inner side of said adaptor collars of said elements engaging said upper locating pins on said center rod;

gasket seals, interposed between said gasket flanges of said adaptor collars and said manifold flange;

said center rod further comprising a shoulder, maintaining the correct distance between said bottom flange and said manifold flange, said upper and lower locating pins holding said elements in a circular, radial, and angular spaced relationship, said springs holding said elements sealingly against said manifold flange;

a combination nut and handle, holding the said screen filter unit in assembly, said handle also being means to remove and install said filter unit.

* * * * *